March 29, 1960 R. S. SANFORD ET AL 2,930,456
LIQUID COOLED BRAKE SYSTEM
Filed Oct. 17, 1956
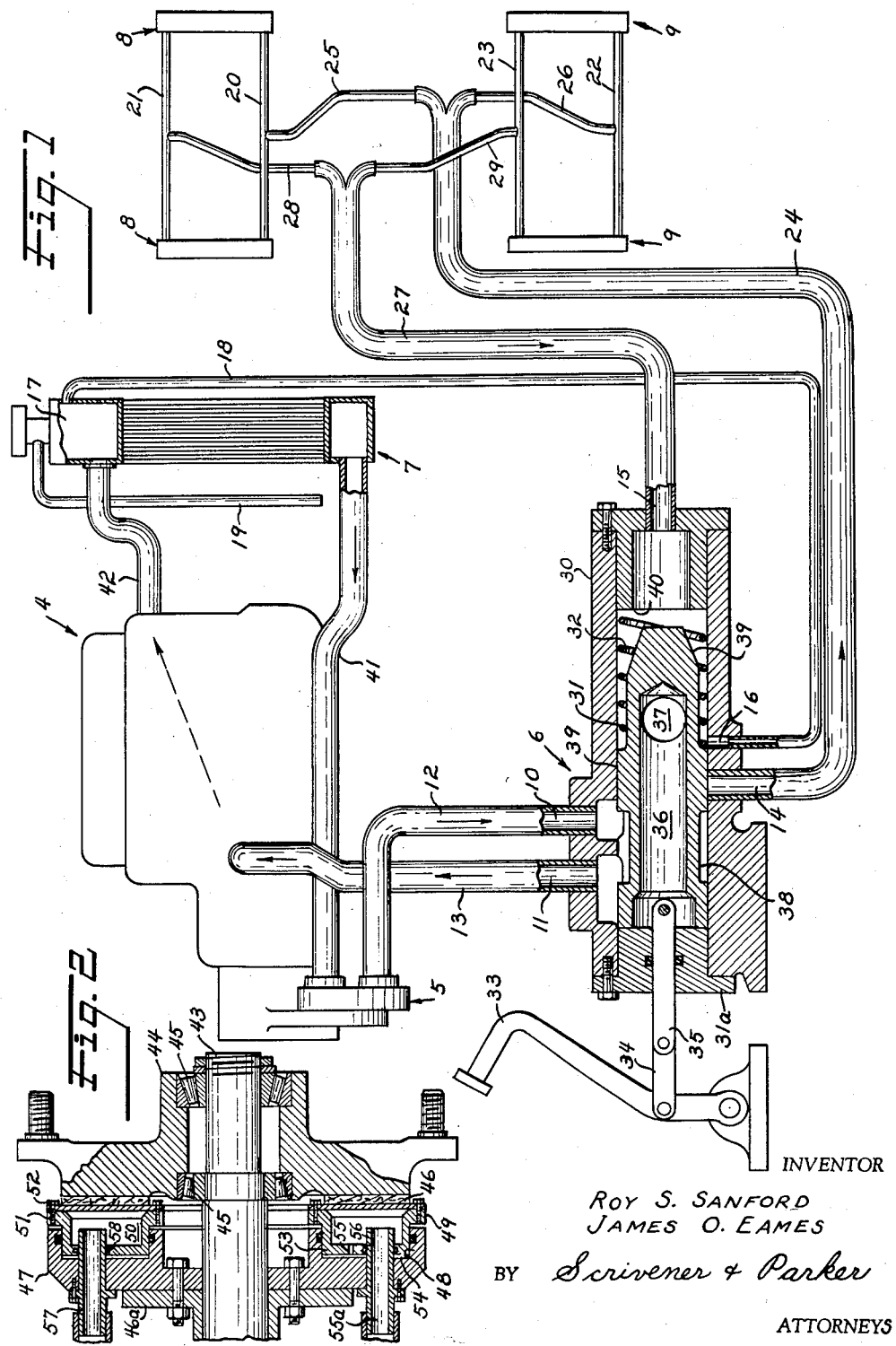
INVENTOR
ROY S. SANFORD
JAMES O. EAMES
BY Scrivener & Parker
ATTORNEYS

2,930,456

LIQUID COOLED BRAKE SYSTEM

Roy S. Sanford, Woodbury, and James O. Eames, Washington, Conn., assignors to Roy S. Sanford, Wilfred A. Eaton, and Erling D. Sedergren, all of Woodbury, and Roger H. Casler and James O. Eames, both of Washington, Conn.

Application October 17, 1956, Serial No. 616,427

1 Claim. (Cl. 188—152)

This invention relates to brake systems, and more particularly to vehicle brake systems of the liquid cooled type.

One of the objects of the invention is the provision of means for insuring equalization of all the brakes on the vehicle.

Another object of the invention is to provide means for insuring proper distribution of the cooling liquid in order to effect the proper degree of cooling in each of the vehicle brakes.

A further object is to provide, in a brake system having brakes cooled by a circulating liquid and actuated by the pressure of said liquid, means for equalizing the flow of liquid through corresponding brakes on opposite sides of the vehicle and for also equalizing the actuating pressures in said brakes.

These and other objects and novel features of the invention will be more fully understood when taken in connection with the accompanying drawings and the following description.

In the drawings, wherein similar parts are designated by similar reference characters throughout the several views:

Fig. 1 is a diagrammatic view, partially in section, of a novel brake system constructed in accordance with the principles of the present invention, and Fig. 2 is a sectional view of a brake mechanism adapted for use in connection with the brake system shown in Fig. 1.

As shown in Fig. 1, the system may include in general a vehicle engine 4 having a pump 5 driven thereby, a brake control valve 6, an engine radiator or heat exchanger 7, front vehicle brakes 8, and rear vehicle brakes 9.

The brake valve 6 is provided with inlet and outlet ports 10 and 11 respectively, the port 10 being connected to the discharge port of the pump by conduit 12, and the outlet port 11 being connected to lower portion of the engine water jacket by conduit 13. In addition, the brake valve is provided with brake supply port 14 and brake return port 15, as well as a vent port 16 connected to upper tank 17 of the radiator by means of a conduit 18, the upper tank of the radiator in turn being connected to atmosphere by a suitable vent pipe 19 as shown. The front brakes 8 of the vehicle are connected to each other by a supply conduit 20 and by a return conduit 21, while the rear brakes 9 are connected by a supply conduit 22 and a return conduit 23, as will be more fully explained hereinafter. The brake supply port 14 is connected to conduits 20 and 22 through a conduit 24 and conduits 25 and 26, while the return port 15 of the brake valve is connected to the conduits 21 and 23 through a conduit 27 and conduits 28 and 29. The conduits 20, 21, 22 and 23 are of uniform cross section throughout their lengths in the embodiment shown.

The brake valve is provided with a casing 30 in which a valve spool 31 is slidably mounted and normally maintained in the position shown against an end cap 31a at the left end of the casing by means of a suitable spring 32. The valve spool is adapted to be operated by a foot pedal 33 connected thereto by means of link 34 and rod 35. A bore 36, open at the left end and normally closed by engagement with cap 31a, is formed in the center of the spool valve, and is connected at its right end to the interior of the casing 30 by means of a suitable port 37 in the wall of the spool. A groove 38 formed on the spool valve serves to normally connect ports 10 and 11, while a land 39 on the spool normally closes the brake supply port 14, and is adapted on initial movement of the spool valve to the right to close the vent port 16 and open port 14. The right end of the spool is provided with a tapered valve portion 39 adapted to engage a valve seat 40 in order to restrict communication between the brake return port 15 and the interior of the casing 30.

From the foregoing, it will be apparent that with the brake pedal in the position shown, the pump, which has its inlet connected to the bottom of the radiator by means of a conduit 41, is adapted to draw cooling liquid from the bottom of the radiator, and pump it back to the upper tank 17 of the radiator through the conduit 12, the groove 38 in the valve, the outlet port 11, the conduit 13, the engine water jacket, and a conduit 42 connecting the upper part of the engine water jacket with the upper tank of the radiator. The brakes themselves are isolated from the above circulatory system by means of the spool valve 31, since the land 39 covers the port 14, and the left end of the spool valve abuts the cap 31a at the left end of the casing in order to prevent communication between the return port 15 and either of the valve ports 10 and 11 through port 37 and bore 36. Consequently no liquid is circulated through the brakes under this condition of operation, and any pressure that may build up on the brakes due to leakage of the valve mechanism is vented to atmosphere through the vent port 16, the conduit 18, the upper tank of the radiator 17, and the vent pipe 19.

On depression of the brake pedal to effect a brake application, the spool valve is moved to the right, thus connecting the central passage 36 in the spool valve with the outlet port 11 of the valve, and partially closing off communication between the inlet and outlet ports 10 and 11. At the same time, the land 39 uncovers the brake supply port 14 and closes the vent port 16, thus causing a portion of the cooling liquid to pass through the brakes through the conduits already described and to return to the brake valve through the brake return port 15. From there, the liquid passes through the inside of the casing to the port 37 in the spool valve and thence through the bore 36 to the outlet port 11 of the brake valve. As the spool valve continues to move to the right, the tapered valve portion 39 approaches the valve seat 40 and imposes a restriction on the return flow of cooling liquid from the brakes to the outlet port 11 of the valve, thus raising the pressure of the liquid in the conduits connecting the control valve with the brakes, communication between ports 10 and 11 is prevented, and the brake supply port 14 is fully opened so that all of the liquid pumped by the pump 5 passes through the brakes and hence back to the radiator through the brake valve and the engine water jacket. As soon as the port 14 is fully open and all of the cooling liquid is passing through the brakes, the pressure may be further increased by further movement of the spool valve to the right to restrict the return flow of liquid from the brakes, thus permitting a graduated brake application by the operator as well as a control of the amount of cooling liquid flowing through the brakes.

Referring now to Fig. 2 of the drawings, a brake mechanism is shown particularly adapted for use in connection with the present brake control system. This brake mechanism includes a vehicle axle 43, having a wheel 44 rotatably mounted thereon as by means of suitable bearings 45. An annular friction disc 46, preferably of a composition material of relatively poor heat conductivity, is secured to the left side of the wheel in any suitable manner for rotation therewith. The axle 43 is carried in a housing 46a and a cylinder member 47 is secured thereto against rotation. An annular cylinder 48 is formed in the right end of the cylinder member, and an annular piston 49 is slidably mounted therein, suitable sealing means being provided to prevent leakage between the piston and cylinder walls. Suitable anchor means, not shown, are provided for preventing rotation of the piston in the cylinder and for allowing axial movement of the piston in the cylinder. The piston is rigid and has a channel 50 formed in the outer end thereof for cooling liquid, the channel being closed by an annular metal plate or friction element 51, preferably of a material having a high heat conductivity, the metallic friction element being secured to the piston by means of suitable screws 52, and being in sealing engagement with the end of the piston. Thus, the chamber 50 forms a cooling chamber directly adjacent the rear face of the metallic friction element, the piston having a back wall 53 as shown. This back wall, in connection with the cylinder 48, forms a pressure chamber 54, and this chamber is connected to the cooling chamber 50 by means of a port 55 in the back wall of the piston preferably located adjacent the inlet to the cooling chamber as will be hereinafter described.

An inlet conduit 55a is secured to the cylinder member 47, and extends into the cooling chamber 50 through a bore 56 in back wall 53, while a similar outlet conduit 57 is secured to the cylinder member and extends into the cooling chamber through a bore 58 in the back wall. Thus, when cooling liquid is supplied to the cooling chamber 50 through the supply conduit 55a, it flows in both directions around the annular chamber 50 to the outlet conduit 57 and is discharged from the brake at that point. The pressure chamber 54 is a static pressure chamber, and is subjected to the pressure of the liquid flowing through the cooling chamber 50 by means of the port 55 heretofore described. Although the port is shown as being adjacent the inlet conduit to the brake, it will be understood that it can be located at any convenient point between the inlet and outlet conduits in such a manner as to impart the pressure of the liquid at that point to the static pressure chamber in order to actuate the brake. As the pressure increases in the cooling chamber, it also increases in the static pressure chamber behind the piston and forces the piston to the right to effect engagement of the metallic friction element 51 with the composition friction ring 46 to effect a brake application. At the same time, the cooling liquid supplied by the pump shown in Fig. 1, is circulated through the cooling chamber in intimate engagement with the metallic friction element directly opposite the surface which engages the composition friction ring, thus effectively removing the heat imparted to the metallic friction element due to the braking operation.

Although only one brake has been shown in Fig. 2, it will be understood that all of the brakes 8 and 9 may be constructed in the same manner, and that the brakes 8 on the front of the vehicle will be substantially identical, while the brakes 9 on the rear end of the vehicle will also be substantially identical, except that these may possibly have a smaller area, depending on the ratio of brake effort desired on the front and rear wheels of the vehicle respectively. In any case, however, it is essential that the areas of the piston on the right and left brakes 8 be the same for purposes of equalization, and it is also essential that the areas of the pistons in the brakes 9 also be the same. It is also desirable that the restrictions to the flow of liquid through the brakes on the right and left sides of the vehicle at the front be identical and that these restrictions also be identical in the rear brakes for purposes of brake equalization as well as equalized heat absorption in order that the brakes on either side of the vehicle at the front and at the rear respectively may operate at substantially the same temperatures. In this connection, it should be noted that due to the arrangement of the static pressure chamber, which has only one connection with the cooling chamber 50, the only flow in the static chamber is that necessary to displace the pistons sufficiently to apply the brakes. Consequently, the effective cross sectional area of the cooling chamber 50 between the inlet and outlet conduits does not change regardless of wear of the metallic friction element or the composition friction ring, and therefore the restriction to flow in each right and left brake does not vary as the brake wears.

It will be understood by those familiar with the brake art, that equalization of the brakes is an essential feature and one which cannot be neglected if a satisfactory brake is to be provided. To this end, it will be noted with reference to the front brakes 8, for example, that the supply conduit 25 is connected to the conduit 20 leading to the right and left brakes substantially half way between the brakes, and that in like manner, the return conduit 28 is connected to the conduit 21 at the midpoint between the brakes, the conduits 20 and 21 being of uniform cross section throughout. It should be noted that the rear brakes are connected in the same manner, and that consequently, due to the fact that the restriction to flow to and from each of the brakes 8 and through each of these brakes is substantially the same, each of these brakes will receive the same flow of cooling liquid at the same pressure, and each will have the same pressure drop therethrough. Since the ports leading to the static pressure chambers are positioned identically in corresponding right and left brakes, the pressure in each static chamber will also be the same and the brakes will be equalized insofar as the force applied to effect engagement of the friction elements is concerned. In view of the fact that the rear brakes 9, although possibly of different size, are connected and constructed in the same manner as the front brakes, the same equalization will occur in connection with the rear brakes as well, thus resulting in a brake system wherein the operator may control the brakes with assurance that they will be fully equalized under all conditions of operation.

It is also a well known fact that particularly in connection with linings of the composition type, the coefficient of friction is apt to change with temperature, resulting in erratic brake operation. It will be seen, however, that in connection with the above described means for supplying cooling liquid to the brakes, that in addition to the pressures in the front brakes being equalized, the flow of cooling liquid through each of these front brakes will also be equalized, resulting in equalized heat dissipation, and the same will be true of the rear brakes, although it is understood that the flow of liquid in the front brakes may be greater or less than that in the rear brakes if desired provided the flow through the right and left front brakes is the same and the flow through the right and left rear brakes is also identical. In the event it is impossible to make conduits 20, 21, 22 and 23 of uniform cross section or to connect the supply and return conduits to the midpoints of these conduits, it will be understood that the flows and the pressures may also be equalized by so choosing the cross sectional areas of the conduits and the lengths of the respective conduits as to obtain the equalized pressures and flows referred to above in the left and right brakes of the vehicles. By way of example, considering that the conduit 25 may be connected to the conduit 20 at the left of the midpoint as shown in the drawing, the portion of the conduit going from the junction of conduits 20 and 25 to the left brake could be made slightly smaller than that going from the junction to the right brake in order to compensate for the changed connection of the conduits 20 and 25.

As stated heretofore, the importance of equalizing the corresponding right and left brakes on a vehicle is well recognized, and in conventional brakes of the hydraulic type as utilized on a large percentage of vehicles now in service, the problem is relatively simple. In these systems, a master cylinder is connected to the brake actuating cylinders by conduits, and when the master cylinder is operated by the driver, liquid is pumped into the brake cylinders to move the pistons therein to apply the brakes. There is no flow of liquid in the conduits except when the pistons are moving to actuate the brake shoes, and consequently, in accordance with the well known laws of hydraulics, the pressures are the same in all of the wheel cylinders and throughout the system whenever the master cylinder piston is stationary at any given brake applied position. In other words, since there is no flow in the conduits and cylinders as the brake is held applied, there can be no variation in pressure in the system. If the line leading from the master cylinder to a right front brake has less restriction to liquid flow than that leading to the left front brake, satisfactory operation of the brakes is not affected unless the difference in restriction is so great as to cause the right brake to apply much sooner than the left brake. In this case, the vehicle would tend to pull to the right at the start of the brake application, but on completion of the brake applying movement, the brakes would be equalized.

Satisfactory equalization is also dependent on the coefficients of friction of the linings on the corresponding right and left brakes, and if these coefficients are not equal, the brakes will not be properly equalized. The coefficient of friction of brake linings tends to vary with temperature, and if the temperature difference is great enough, the brakes will not operate satisfactorily. However, this is not a problem with the conventional hydraulic brakes, since the right and left brakes are subjected to substantially the same degree of cooling by convection, radiation, and conduction, the brakes are actuated with the same force, and consequently the lining temperatures on the right and left brakes do not differ enough to affect brake operation.

In the present instance, however, we are dealing with a brake system wherein the brake shoes are cooled by a flowing liquid, and are actuated by the pressure of that liquid. Thus we have a dynamic rather than a static hydraulic system, there being a zone of relatively high pressure in the circuit adjacent the discharge port of the circulating pump and a zone of lower pressure adjacent the suction port of the pump, with the pressure dropping progressively in the circuit between the pump discharge port and pump suction port, a fact which precludes connecting corresponding right and left brakes in series, since assuming the right brake to be the first in the series, the actuating pressure for the right brake would be appreciably greater than that for the left brake. The flow of cooling liquid would be the same for both brakes, but the liquid flowing through the left brake, being already heated by the right brake, would have less ability to absorb heat from the brake friction elements and consequently the left brake would be much hotter, resulting in a difference in the coefficient of friction of the right and left brake linings and friction elements with consequent unsatisfactory brake operation and unequal wear on the right and left sides.

It will be readily apparent from the foregoing, that satisfactory operation of a liquid cooled dynamic system having the brakes actuated by the pressure of the circulating liquid, poses problems which are entirely absent in systems of the static type. It will also be apparent that in the dynamic system, referring again by way of example to the operation of corresponding right and left brakes, the temperature of the cooling liquid entering the two brakes should be substantially the same, the flow of liquid through each brake should be the same, and the brake actuating pressures should be the same, if satisfactory operation is to be had. If these conditions are met, as in the present invention, the actuating forces are equalized, and the heat absorbing or dissipating capacities of the brakes are also equalized.

Although the invention has been illustrated and described with considerable particularity, it is to be understood that the same is not to be considered as limited thereby, and that other embodiments of the invention may suggest themselves to those skilled in the art. Reference will be had, therefore, to the appended claim for a definition of the limits of the invention.

What is claimed is:

A brake system for a vehicle having corresponding right and left hand wheels, said system including a brake associated with each wheel and each brake including a friction member rotatable with the wheel, a brake shoe having a chamber for cooling liquid, the outer surface of one wall of said chamber being adapted for frictional engagement with the friction member, inlet and outlet ports in the shoe for supplying cooling liquid thereto and for discharging cooling liquid therefrom, the chambers in each shoe having substantially the same restriction to the flow of cooling liquid between the inlet and outlet ports thereof, and pressure responsive actuating means for each shoe including a pressure chamber for each actuating means, the actuating means for each brake having substantially equal areas, a positive displacement liquid circulating pump having a discharge port and a suction port, means for connecting said brake shoe inlet ports in parallel to said pump discharge port, said connecting means being so constituted and dimensioned that the pressure drop from the pump discharge port to each brake shoe inlet port is substantially the same, means for connecting said brake shoe outlet ports in parallel to said pump inlet port, the last named connecting means being so constituted and dimensioned that the pressure drop from each brake shoe outlet port to the pump inlet port is substantially the same, said brake shoe chambers, said first and second named connecting means and said pump forming a cooling liquid circuit, an operator controlled restricting valve in the connecting means from the brake shoe outlet ports to the pump inlet port for restricting the flow of liquid from said chambers to the pump inlet port to increase the pressure of the liquid in the chambers, the liquid flowing continuously when the brakes are held applied, and means for connecting a high pressure region of the circuit to the pressure chamber of each actuating means to effect actuation of the brakes by the cooling liquid in the circuit, the connecting means to the pressure chambers being so constituted and so connected to the circuit as to supply liquid from the circuit to each pressure chamber is substantially the same pressure.

References Cited in the file of this patent

UNITED STATES PATENTS

| | | |
|---|---|---|
| 1,723,032 | Harrington | Aug. 6, 1929 |
| 2,062,500 | Casler et al. | Dec. 1, 1936 |
| 2,127,557 | Ells | Aug. 23, 1938 |
| 2,174,635 | Linderman | Oct. 3, 1939 |
| 2,267,389 | Wolf | Dec. 23, 1941 |
| 2,316,497 | Woodhouse et al. | Apr. 13, 1943 |
| 2,406,304 | Levy | Aug. 20, 1946 |
| 2,821,273 | Sanford et al. | Jan. 28, 1958 |